US007840943B2

(12) United States Patent
Volkov

(10) Patent No.: US 7,840,943 B2
(45) Date of Patent: Nov. 23, 2010

(54) METHOD AND APPARATUS FOR TRANSFERRING DATA IN A DISTRIBUTED TESTING SYSTEM

(75) Inventor: Alexei Volkov, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 2194 days.

(21) Appl. No.: 10/637,132

(22) Filed: Aug. 8, 2003

(65) Prior Publication Data

US 2005/0034103 A1 Feb. 10, 2005

(51) Int. Cl.
*G06F 9/44* (2006.01)
*G06F 9/45* (2006.01)

(52) U.S. Cl. .................. 717/124; 717/103; 717/125

(58) Field of Classification Search ......... 717/124–129, 717/104–113
See application file for complete search history.

(56) References Cited

U.S. PATENT DOCUMENTS

| 5,475,843 | A | * | 12/1995 | Halviatti et al. ............. 717/124 |
| 5,758,122 | A | * | 5/1998 | Corda et al. ................ 717/125 |
| 5,966,532 | A | * | 10/1999 | McDonald et al. .......... 717/105 |
| 6,093,215 | A | * | 7/2000 | Buxton et al. ............... 717/107 |
| 6,163,880 | A | * | 12/2000 | Ramalingam et al. ....... 717/104 |
| 6,257,774 | B1 | * | 7/2001 | Stack .......................... 717/110 |
| 6,345,383 | B1 | * | 2/2002 | Ueki ............................ 717/124 |
| 6,507,945 | B1 | * | 1/2003 | Rust et al. ................... 717/103 |
| 6,671,875 | B1 | * | 12/2003 | Lindsey et al. .............. 717/129 |
| 6,681,383 | B1 | * | 1/2004 | Pastor et al. ................ 717/126 |
| 6,701,514 | B1 | * | 3/2004 | Haswell et al. .............. 717/115 |
| 6,721,941 | B1 | * | 4/2004 | Morshed et al. ............. 717/127 |
| 6,732,353 | B1 | * | 5/2004 | Bloom et al. ................ 717/103 |
| 6,915,509 | B1 | * | 7/2005 | Chkodrov et al. ........... 717/124 |
| 6,944,848 | B2 | * | 9/2005 | Hartman et al. ............. 717/124 |
| 6,993,747 | B1 | * | 1/2006 | Friedman .................... 717/124 |
| 6,993,748 | B2 | * | 1/2006 | Schaefer ..................... 717/124 |
| 7,055,136 | B2 | * | 5/2006 | Dzoba et al. ................ 717/125 |
| 7,058,857 | B2 | * | 6/2006 | Dallin ......................... 714/38 |
| 7,093,238 | B2 | * | 8/2006 | Givoni et al. ............... 717/129 |
| 7,096,453 | B2 | * | 8/2006 | Dionne et al. ............... 717/105 |
| 7,428,723 | B2 | * | 9/2008 | Greene et al. ............... 717/103 |

OTHER PUBLICATIONS

Zheng et al, "Model based software component testing: A UML based approach", IEEE ICIS, pp. 1-8- 2007.*
Wappler et al, "Using evolutionary algorithms for the unit testing of object oriented software", ACM GECCO, pp. 1053-1060, 2005.*

(Continued)

*Primary Examiner*—Anil Khatri
(74) *Attorney, Agent, or Firm*—Martine Penilla & Gencarella, LLP

(57) ABSTRACT

A system and method for testing a software product in a distributed testing system is provided where the distributed testing system includes a main server component system and at least two client component systems. The method includes generating at least one data object to be locally stored in a memory of the first client component system and registering a location of the data object with the main server component system. Thereafter, the method includes transferring the data object from the first client component system to the second client component system in response to the second client component system requesting the data object from the first client component system through the main server component system.

27 Claims, 7 Drawing Sheets

OTHER PUBLICATIONS

Gallagher et al, "Automatically testing interacting software components", ACM AST, pp. 57-63, 2006.*

Senthil et al, "An improved component model for component based software engineering", ACM SIGSOFT, vo. 32, No. 4, pp. 1-19, 2007.*

Ed Ort, "The Java Compatibility Test Tools: JavaTest Harness," Oct. 2001, http://developer.java.sun.com/developer/technicalArticles/JCPtoos2/.

* cited by examiner

METHOD AND APPARATUS FOR TRANSFERRING DATA IN A DISTRIBUTED TESTING SYSTEM

BACKGROUND OF THE INVENTION

1. Field of the Invention

The present invention relates generally to testing in Java based environments, and more particularly to a method of transferring data between applications in a distributed testing system.

2. Description of the Related Art

As the use of software in performing daily tasks rapidly increases, assessing software reliability through software testing has become an imperative stage in the software development cycle. As is well known, software testing is used to find and eliminate defects (i.e., bugs) in software, which, if undetected, can cause the software to operate improperly. One method for performing testing in a Java environment is via a test harness. By way of background, Java is an interpreted language that utilizes a Java Virtual Machine (JVM) as an interpreter. The JVM is a software layer that converts Java intermediate language (byte code) into machine language.

Essentially, the test harness is a tool executed on a computer system that manages a set of tests. The tests can be conducted on a single computer system and can also be distributed across multiple computer systems. The purpose of distributing tests across multiple computer systems is because multiple computer systems execute tests faster than a single computer system. In order to distribute the tests across multiple computer systems, the tests are broken into test components for distribution across multiple computer systems. As a result, the test components are typically interrelated because they are pieces from one set of tests.

In the prior art distributed testing system, a main server testing system manages the test components distributed across multiple computer systems. The computer systems execute the test components and generate resulting test data in memories of the computer systems. The resulting data in the memories of the computer systems are then saved as files and the files are transferred to the main server testing system for processing and analysis. Since the tests are typically interrelated, the computer systems need to access the resulting test data from other computer systems during execution in order to continue execution of their own tests.

A difficulty with the prior art distributed testing system is that the computer systems can share saved files but not data stored in the memories of the computer systems. As a result, the computer systems must save the resulting test data as files in order to share the resulting test data. The computer systems often need to access the resulting test data from other computer systems during execution in order to continue their own tests because the tests are related. However, during execution, the resulting test data are constantly changing and are constantly being updated. As a result, the computer systems need to constantly save the resulting test data every time the resulting test data are updated in their memories. Additionally, the saved resulting test data need to be constantly transferred to the main server testing system for processing. The added step of saving the resulting test data as files during execution and processing the files creates extra processing steps that significantly slow down the execution of the tests.

Another limitation is that the computer systems cannot share data that cannot be saved as files. For example, in order to establish a secured connection between the computer systems, identification keys need to be shared between the computer systems. Since the identification keys cannot be saved as a file, the prior art distributed testing system cannot establish a secured connection between the computer systems.

In view of the foregoing, there is a need for testing methods and systems that provide for the transfer of data held in memory of a computer system to another computer system in a distributed testing system.

SUMMARY OF THE INVENTION

Broadly speaking, the present invention fills these needs by providing a system and method to test a software product in a distributed testing system. It should be appreciated that the present invention can be implemented in numerous ways, including as a process, an apparatus, a system, computer readable media, or a device. Several inventive embodiments of the present invention are described below.

One embodiment provides a method for testing a software product in a distributed testing system where the distributed testing system includes a main server component system and at least two client component systems. The method includes generating at least one data object to be locally stored in a memory of the first client component system and registering a location of the data object with the main server component system. Thereafter, the method includes transferring the data object from the first client component system to the second client component system in response to the second client component system requesting the data object from the first client component system through the main server component system.

An alternative embodiment provides a method for testing a software product in a distributed testing system where the distributed testing system includes a main server component system and at least two client component systems. The method includes executing a portion of a test at a first client component system and generating at least one data object to be locally stored in a memory of the first client component system. Thereafter, the method includes registering a location of the data object with the main server component system and transferring the data object from the first client component system to the second client component system in response to the second client component system requesting the data object from the first client component system through the main server component system.

Another embodiment includes a system for testing a software product in a distributed testing system. The system includes a main server component system and a first and a second client component systems where the client component systems are in communication with the main server component system. The system additionally includes a data object located in a memory of the first client component system. The main server component system facilitates communication between the client component systems, and a location of the data object is registered with the main server component system for use in transferring the data object from the first client component system to the second client component system. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

An invention is disclosed for a method and apparatus for testing a software product in a distributed testing system. In the following description, numerous specific details are set forth in order to provide a thorough understanding of the present invention. It will be understood, however, by one of ordinary skill in the art, that the present invention may be practiced without some or all of these specific details. In other instances, well known process operations have not been described in detail in order not to unnecessarily obscure the present invention.

Figure 1:
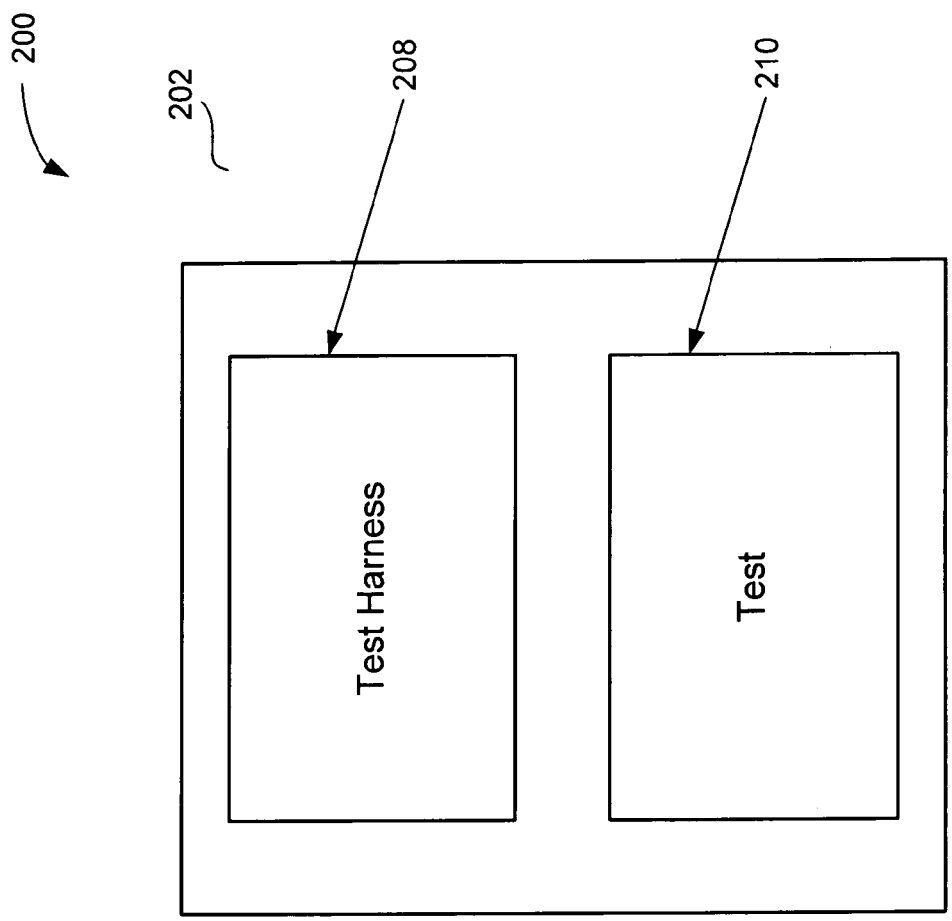
FIG. 1 is a block diagram illustrating a testing configuration with a single computer system, in accordance with an embodiment of the present invention.

FIG. 1 is a block diagram illustrating a testing configuration 200 with a single computer system 202, in accordance with an embodiment of the present invention. As exemplified in FIG. 1, a test harness 208 is executed on the computer system 202 and the test harness 208 executes a test 210 on the computer system 202.

In one embodiment, the test harness 208 runs a test suite, which is a collection of related tests. As is well known, a test suite is a plurality of tests designed to test particular aspects of software and/or hardware present on the computer system 202. Although embodiments of the present invention may be described in terms of processing test suites, it should be noted that any test configuration can be utilized with the embodiments of the present invention.

As can be appreciated, embodiments of the present invention typically are implemented using Java as a programming language, which is designed to generate applications that can run on all hardware platforms, small, medium and large, without modification. Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

Java is an interpreted language, in that the source code of a Java program is compiled into an intermediate language called "byte code." The byte code is then converted (interpreted) into machine code at runtime. For example, upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software.

Figure 2:
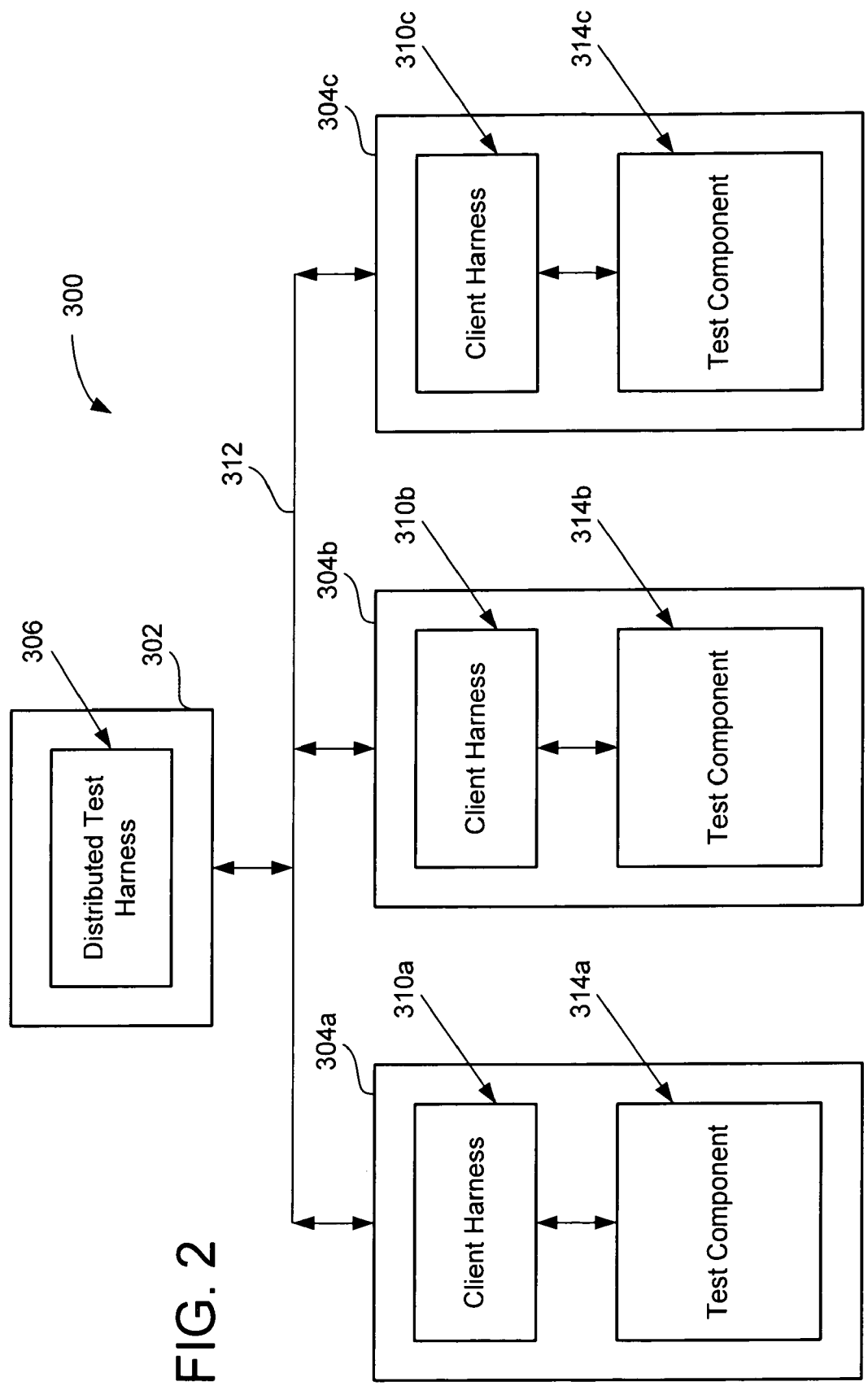
FIG. 2 illustrates a distributed testing system for use in a distributed computing environment, in accordance with an embodiment of the present invention.

FIG. 2 illustrates a distributed testing system 300 for use in a distributed computing environment, in accordance with an embodiment of the present invention. In addition to performing testing on the single computer system 202, embodiments of the present invention can distribute the testing process across multiple client component systems 304a-304c using client harnesses 310a-310c to execute test components 314a-314c. The distributed testing system 300 includes a distributed test harness 306 executing on a main server component system 302 and the client harnesses 310a-310c executing on the client component systems 304a-304c. As is well known, a client harness, like the client harnesses 310a-310c, has the ability to run the test suite on a different platform that the one in which a distributed test harness, like the distributed test harness 306, runs. This allows the client harnesses 310a-310c to run the test suite on the intended platform for implementation. For example, an implementation of a Connected Limited Device Configuration (CLDC) of Java 2 Platform Micro Edition (J2ME) is designed for small, mobile devices such as pagers and cell phones. The distributed test harness 306, by comparison, runs on a personal computer (PC) or a workstation with Java 2 Standard Edition (J2SE). In an exemplary embodiment, the client harnesses 310a-310c are designed so that the test suite for the CLDC implementation can emulate running on a device such as a cell phone with J2ME, while the distributed test harness 306 runs on the PC. The client component systems 304a-304c can emulate any type of electronic devices such as computers, pagers, cell phones, personal digital assistants, etc. The main server component system 302 can be any computer or electronic device on a network that manages network resources.

As embodiments of the present invention can implement the J2ME application, a brief introduction to J2ME is provided below. The Java 2, Micro Edition (J2ME) platform is a Java platform for consumer and embedded devices such as mobile phones, Personal Digital Assistants (PDAs), TV set-top boxes, in-vehicle telematics systems, and a broad range of embedded devices. Similar to the enterprise (J2EE), desktop (J2SE™) and smart card (Java Card™) counterparts, the J2ME platform is a set of standard Java application program interfaces (APIs) defined through the Java Community Process$^{SM}$ program by expert groups that include leading device manufacturers, software vendors and service providers.

The J2ME platform delivers the power and benefits of Java technology tailored for consumer and embedded devices. The J2ME provides a flexible user interface, robust security model, broad range of built-in network protocols, and support for networked and disconnected applications. J2ME applications are written for a wide range of devices. As such, the J2ME applications can be downloaded dynamically and leverage each native capability of each device. The J2ME platform can be deployed on millions of devices (e.g., mobile phones, PDAs, automotive devices, etc.) supported by leading Java technology tools vendors and used by companies worldwide. Briefly stated, J2ME is the preferable platform for consumer and embedded devices.

The J2ME architecture defines configurations, profiles and optional packages as elements for building complete Java runtime environments that meet the requirements for a broad range of devices and target markets. Each combination is optimized for the memory, processing power, and I/O capabilities of a related category of devices. The result is a common Java platform that fully leverages each type of device to deliver a rich user experience.

Configurations

Configurations are composed of a virtual machine and a minimal set of class libraries. The configurations provide the base functionality for a particular range of devices that share similar characteristics (e.g., network connectivity, memory footprint, etc.). Currently, there are two J2ME configurations: the Connected Limited Device Configuration (CLDC), and the Connected Device Configuration (CDC):

CLDC

CLDC is the smaller of the two configurations, and by way of example, is designed for devices with intermittent network connections, slow processors, and limited memory (e.g., mobile phones, two-way pagers, PDAs, etc.). By way of example, the devices may have either 16- or 32-bit CPUs, and a minimum of 128 KB to 512 KB of memory available for the Java platform implementation and the associated applications.

CDC

CDC is designed for devices having more memory, faster processors, and greater network bandwidth (e.g., TV set-top boxes, residential gateways, in-vehicle telematics systems, high-end PDAs, etc.). CDC includes a full-featured Java virtual machine, and a much larger subset of the J2SE platform than CLDC. As a result, most CDC-targeted devices have 32-bit CPUs and a minimum of 2 MB of memory available for the Java platform and associated applications.

Profiles

In order to provide a complete runtime environment targeted at specific device categories, configurations can be combined with a set of higher level APIs or profiles that further define the application life cycle model, the user interface, and access to device specific properties.

Mobile Information Device Profile

The Mobile Information Device Profile (MIDP) is designed for mobile phones and entry-level PDAs. Broadly speaking, MIDP can be used on any computing device that needs to take advantage of MIDP's functions. MIDP is a set of Java APIs which, together with CLDC, provides a complete J2ME application runtime environment targeted at mobile information devices, such as mobile phones and entry level PDAs. In this manner, MIDP offers the core application functionality required by mobile applications (e.g., the user interface, network connectivity, local data storage, and application management, etc.). Combined with CLDC, MIDP provides a substantially complete Java runtime environment that leverages the capabilities of handheld devices and minimizes both memory and power consumption.

Currently, CLDC, combined with the MIDP is the Java runtime environment for mobile information devices (MIDs) (e.g., phones, entry level PDAs, etc.). MIDP provides the core application functionality required by mobile applications (e.g., the user interface, network connectivity, local data storage, and application lifecycle management packaged as a standardized Java runtime environment and set of Java APIs, etc.).

Foundation Profile

CDC profiles are layered so that profiles can be added as needed to provide application functionality for different types of devices. The Foundation Profile (FP) is the lowest level profile for CDC and provides a network-capable implementation of CDC that can be used for deeply embedded implementations without a user interface. FP can also be combined with Personal Basis Profile and Personal Profile for devices that require a graphical user interface (GUI).

Personal Profile

The Personal Profile (PP) is the CDC profile aimed at devices requiring full GUI or Internet applet support (e.g., high-end PDAs, communicator-type devices, game consoles, etc.). PP includes the full Java Abstract Window Toolkit (AWT) libraries and offers Web fidelity capable of easily running Web-based applets designed for use in a desktop environment. PP replaces PersonalJava™ technology and provides PersonalJava applications a clear migration path to the J2ME platform.

Personal Basis Profile

The Personal Basis Profile (PBP), is a subset of PP. PBP provides an application environment for network connected devices that support a basic level of graphical presentation or require the use of specialized graphical toolkits for specific applications. Devices (e.g., TV set-top boxes, in-vehicle telematics systems, information kiosks, etc.) Both PP and PBP are layered on top of CDC and FP.

Optional Packages

The J2ME platform can be further extended by combining various optional packages with CLDC, CDC, and their corresponding profiles. In this manner, specific market requirements can be addressed. Furthermore, optional packages can offer standard APIs for using both existing and emerging technologies (e.g., Bluetooth, Web services, wireless messaging, multimedia, database connectivity, etc.). As optional packages are modular, device manufacturers can include the optional packages, as needed, to fully leverage the features of each device.

By way of example, J2ME™ Mobile Media API Reference Implementation Version 1.0 (MMAPI) extends the functionality of the J2ME platform by providing audio, video and other time-based multimedia support to resource-constrained devices. MMAPI allows Java developers to gain access native multimedia services available on a given device.

The reference implementation for MMAPI runs on the CLDC/MIDP profile running on Windows 2000. By way of example, the reference implementation for MMAPI has support for simple tone generation, tone sequencing, audio/video file playback and streaming, interactive MIDI, and audio/video capture. The J2ME MMAPI reference implementation is a source code product provided for porting to various platforms. The MMAPI specification has been developed through the Java Community Process$^{SM}$ (i.e., JSR-135) by an expert group composed of companies representing device manufacturers, wireless operators and software vendors.

As shown in FIG. 2, the main server component system 302 is in communication 312 with the client component systems 304a-304c. In an exemplary embodiment, each client component system 304a-304c communicates 312 with the main server component system 302 using a stream connection, and supports Transmission Control Protocol/Internet Protocol (TCP/IP) for transmitting data over networks. Other exemplary embodiments include communication using serial connections based on RS-232 communication protocols, infrared light wave connections, Universal Serial Bus (USB) connections, and FireWire™ connections. Although FIG. 2 shows three client component systems 304a-304c, it should be noted that any number of client component systems can be included in a distributed testing system 300 in accordance with embodiments of the present invention.

As a server, the main server component system 302 facilitates communication 312 between the client component systems 304a-304c and, as a result, the main server component system 302 is able to transmit and receive data objects to and from the client component systems 304a-304c. The data objects can be any type of data. In one embodiment, the main server component system 302 determines which client component systems 304a-304c to execute a test component 314a-314c, which is a portion of a test. Once determined, the main server component system 302 transmits initial test data to each of the corresponding client component systems 304a-304c. As such, in this embodiment, the data object is the initial test data. Other examples of the initial test data for test components include configuration files and property files. In another exemplary embodiment, the client component systems 304a-304c receive and transfer identification keys for use in a secured protocol to establish a secured communication between the main server component system 302 and the client component systems 304a-304c. Thus, in the secured protocol example, the data object is an identification key. Additional exemplary embodiments of the data objects include dynamically generated Java classes and resulting test data generated after executing a portion of a test at the client component systems 304a-304c.

Figure 3A:
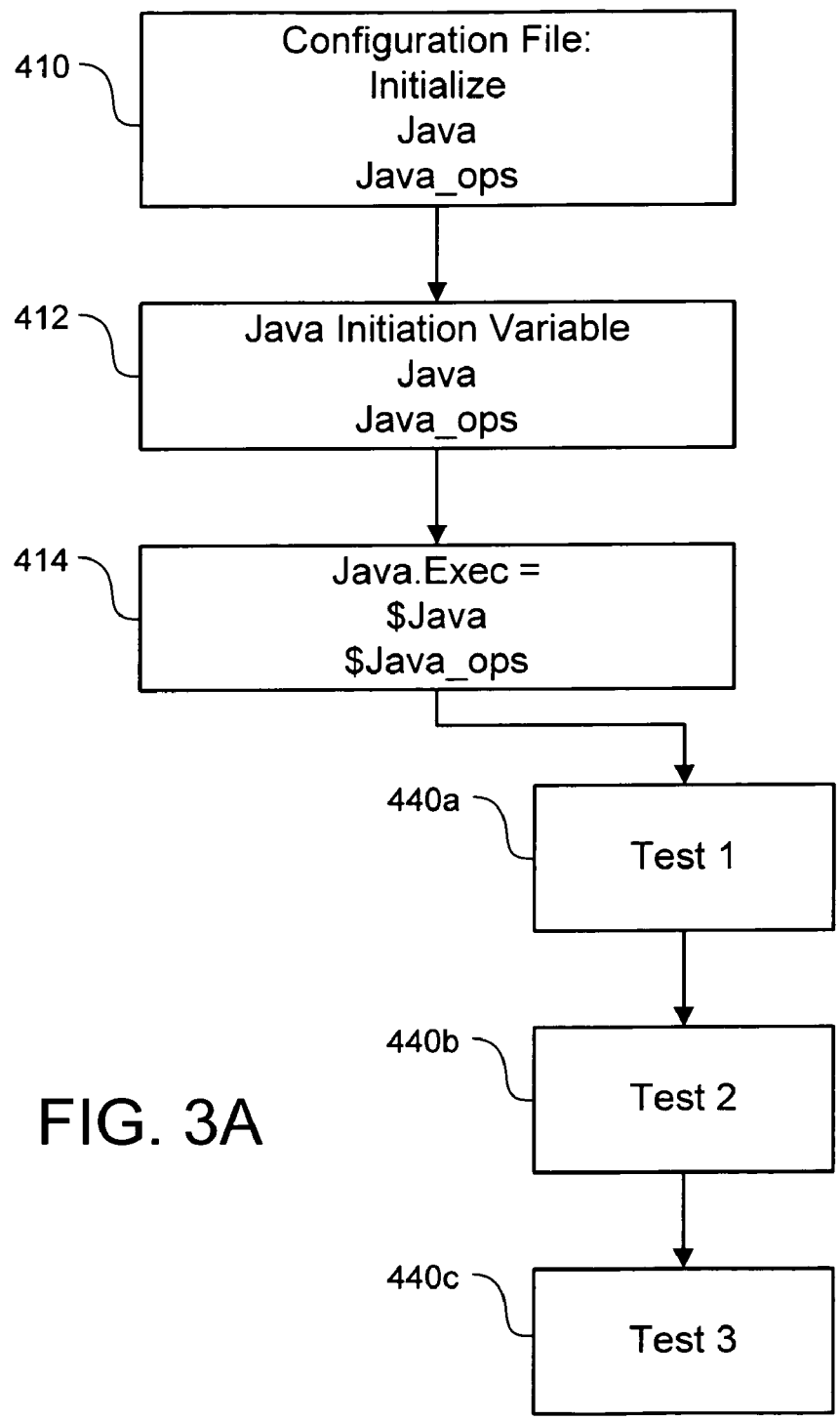
FIG. 3A is a block diagram illustrating the distributed testing system executing a test suite, in accordance with an embodiment of the present invention.

FIG. 3a is a block diagram illustrating the distributed testing system 300 executing a test suite, in accordance with an embodiment of the present invention. Before executing the test suite, a user specifies configuration information stored in a configuration file to run the test suite. In an exemplary embodiment, the configuration information includes test environment data and test parameters. Examples of test environment data include names and internet protocol (IP) addresses of the client component systems. An example of a test parameter includes selecting which test components in the test suite to run at a particular client component system.

In one embodiment, operation 410 and 412 illustrate the first two stages of executing the test suite. Starting in operation 410, the configuration file includes configuration information, such as test environment data (JAVA) and options of the test environment data (JAVA_OPS), to run the test suite. Thereafter, in operation 412, the JAVA and the JAVA_OPS are initialized.

In operation 414, the JAVA and the JAVA_OPS are passed to a collection of related tests 440a-440c in the test suite for execution. In one embodiment, each of the related tests 440a-440c is distributed to the client component systems for execution. In another embodiment, all the related tests 440a-440c are executed on one computer system.

Thereafter, the execution of the related tests 440a-440c generates resulting test data stored locally in memories of the client component systems, in accordance with one embodiment of the present invention. Examples of memories in the client component systems include random-access memory (RAM), dynamic RAM (DRAM), static RAM (SRAM), cache, etc.

Figure 3B:
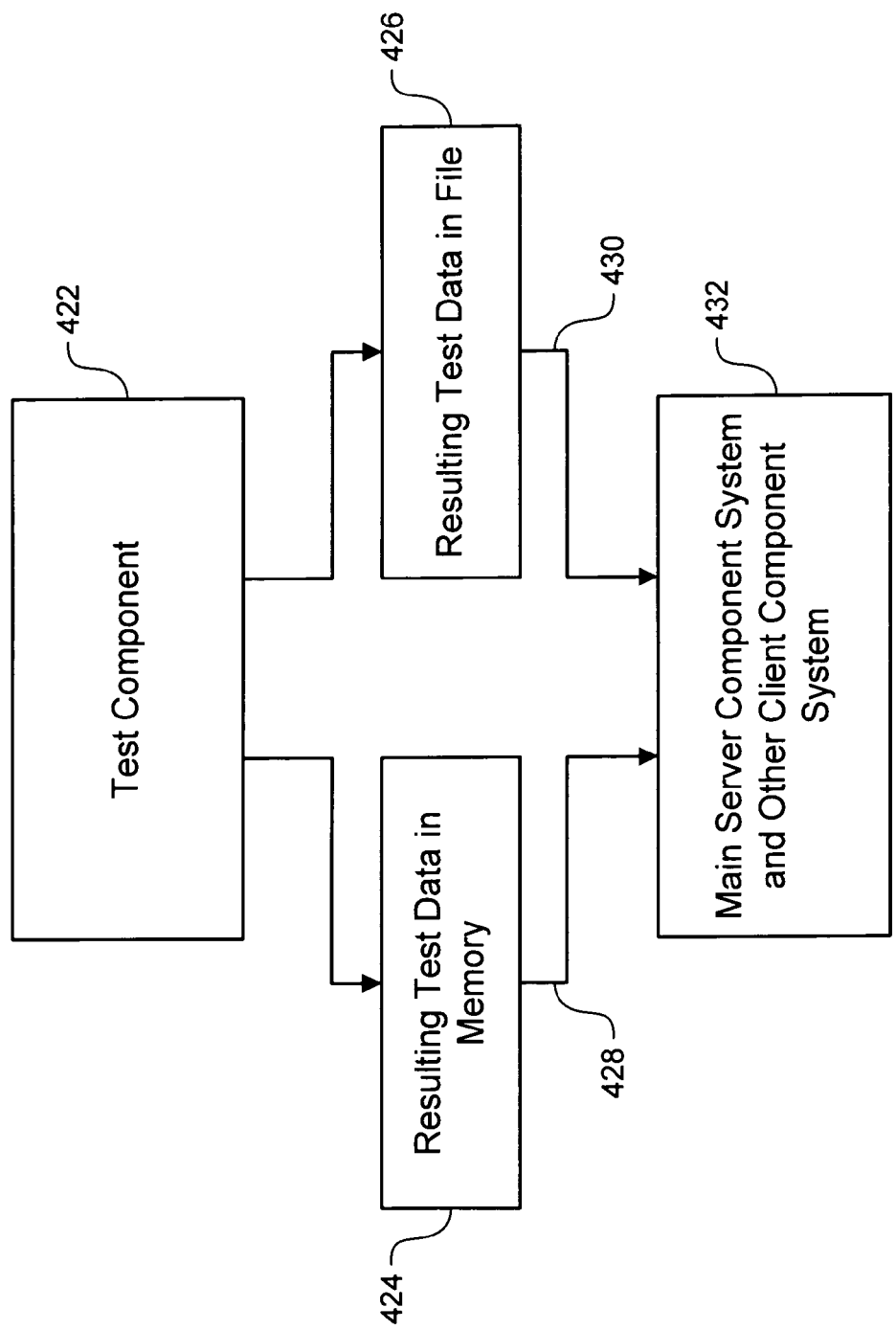
FIG. 3B is a block diagram illustrating the main server component system and other client component systems accessing the resulting test data stored locally in the memory of the client component system, in accordance with an embodiment of the present invention.

As discussed in the background section, the prior art distributed testing system can only access the resulting test data saved locally as a file in the client component system and cannot access the resulting test data stored in the memory of the same client component system. However, as illustrated in FIG. 3b, the main server component system and other client component systems can access the resulting test data stored locally in the memory of the client component system, in accordance with an embodiment of the present invention. In operation 422, the client harness executes a test component and generates the resulting test data stored locally in the memory of the client component system 424. In another embodiment, the resulting test data are saved as one or more files 426 whereby the files are stored on storage medias such as hard disk drives, floppy disks, optical disks, tapes, etc. Finally, in operation 432, the main server component system and other client component systems have access to the resulting test data stored locally in the memory 424 and stored on the storage media as files 430 on the client component system.

Figure 4:
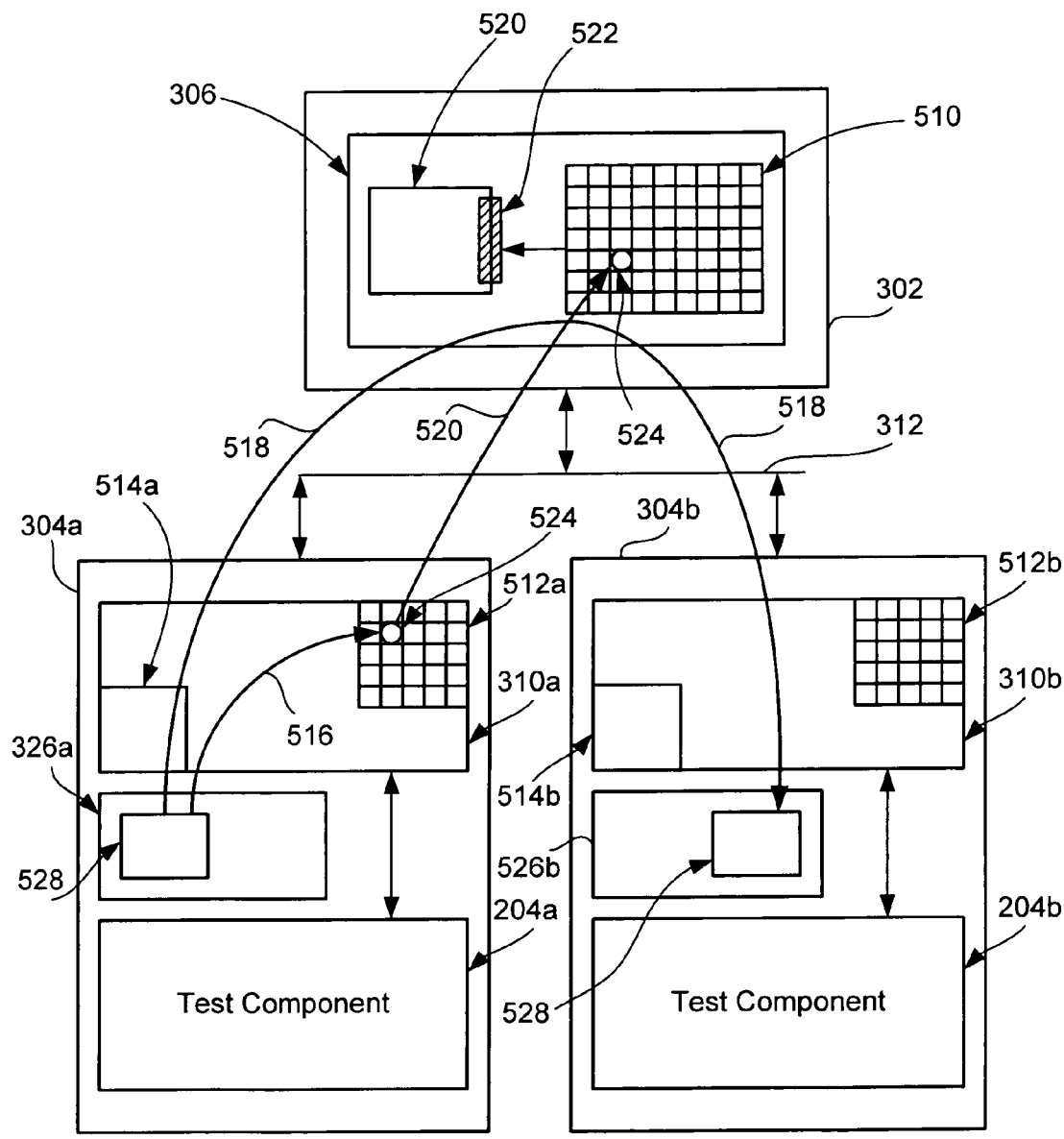
FIG. 4 illustrates a detailed view of the main server component system in communication with the client component systems, in accordance with an embodiment of the present invention.

FIG. 4 illustrates a detailed view of the main server component system 302 in communication with the client component systems 304a and 304b, in accordance with an embodiment of the present invention. In one embodiment, the distributed test harness 306 executed on the main server component system 302 contains a shared object table 510. The shared object table 510 stores locations of data objects, like a location of a data object 524, whereby the data objects, like a data object 528, are stored in memories, like the memories 526a and 526b, of the client component systems, like the client component systems 304a and 304b. In an exemplary embodiment, the location of the data object 524 can be a memory address of the data object 528. Each data object stored in the memory of a client component system has a unique memory address. The memory address identifies the location of the data object stored in the memory.

In another embodiment, the shared object table 510 can store additional information such as data types and accessibility modes of the data objects. A data type is a classification of a particular type of information. Examples of generic data types include integer data, floating-point data, binary data, text data, etc. In another embodiment, the data types can be a user defined classification. The accessibility modes designate the accessibility of the data objects. Examples of accessibility modes include information designating that the data object could only be read by other client component systems, information designating that the data object can be read and transferred to other client component systems, and information designating a length of time that the data object can exist. Although each record of a data object in the shared object table 510 can be any size, an exemplary size may be up to about 10 bytes of data.

The client harnesses 310a and 310b executed on the client component systems 304a and 304b can also contain client tables 512a and 512b, in accordance with an embodiment of the present invention. The client tables 512a and 512b store the locations of the data objects, whereby the data objects are stored in memories of the client component systems. As discussed, in an exemplary embodiment, the location 524 can be the memory address of the data object 528. In another exemplary embodiment, as discussed above, the client tables 512a and 512b can store additional information such as data types and accessibility modes of the data objects.

FIG. 4 shows an exemplary embodiment of the first client component system 304a transferring a data object 528 stored in the first memory 526a to the second client component system 304b. In one embodiment, the location of the data object 524 is registered 516 with the first client component system 304a. By registering, the first client table 512a stores the location of the data object 524. If a user configures the data object 528 to be shared with the second client component system 304b, the first client component system 304a registers 520 the location of the data object 524 with the main server component system 302. By registering, the shared object table 510 stores the location of the data object 524.

Subsequently, the second client component system 304b makes a request to the main server component system 302 for the data object 528 stored in the first memory 526a of the first client component system 304a. As a result, the main server component system 302 looks up the location of the data object 524 in the shared object table 510 and sends a request to the first client component system 304a for the data object 528. In response, the first client component system 304a looks up the location of the data object 524 from the first client table 512a and transfers 518 the data object 528 from the first memory 526a to the second memory 526b of the second client component system 304b, in accordance with one embodiment of the present invention.

In another embodiment, the client component systems 304a and 304b include file systems 514a and 514b. An operating system, such as Solaris™ from Sun Microsystems, Microsoft Windows™, Linux, Disk Operating System (DOS), Apple Operating System, etc., or an application program use the file systems 514a and 514b to organize and keep track of files stored in storage medias such as hard disk drives, floppy disks, optical disks, tapes, etc. Thus, the file systems 514a and 514b in the client component systems 304a and 304b allow the client component systems 304a and 304b to save the data objects 528 as files. In an exemplary embodiment, the first client component system 304a saves the data object 528 as a file and transfers 518 the file to the second client component system 304b.

The main server component system 302 can also include a data transfer monitor facility 520, in accordance with an embodiment of the present invention. The data transfer monitor facility 520 is coupled to the shared object table 510 through a gate 522. In an exemplary embodiment, the data transfer monitor facility 520 displays data objects 528 transferred and keeps a running log of all information about records of the data objects 528 stored in the shared object table 510. In this way, a user can use the data transfer monitor facility 520 to debug tests, keep track of the records stored in the shared object table 510, and set permission settings. In another embodiment, the data transfer monitor facility 520 allows the direct manipulation of the records in the shared object table 510. Examples of manipulation commands include add, delete, and modify records. In another exemplary embodiment, the data transfer monitor facility 520 uses a generic shell script whereby the shell script can process any data. In one embodiment, the shell script can be setup to receive events, such as a registering a data object event, and execute statements upon receiving the events. Since the shell script can process any data, the data transfer monitor facility 520 can also be coupled to the client component systems 304a and 304b, in accordance with an embodiment of the present invention.

Figure 5:
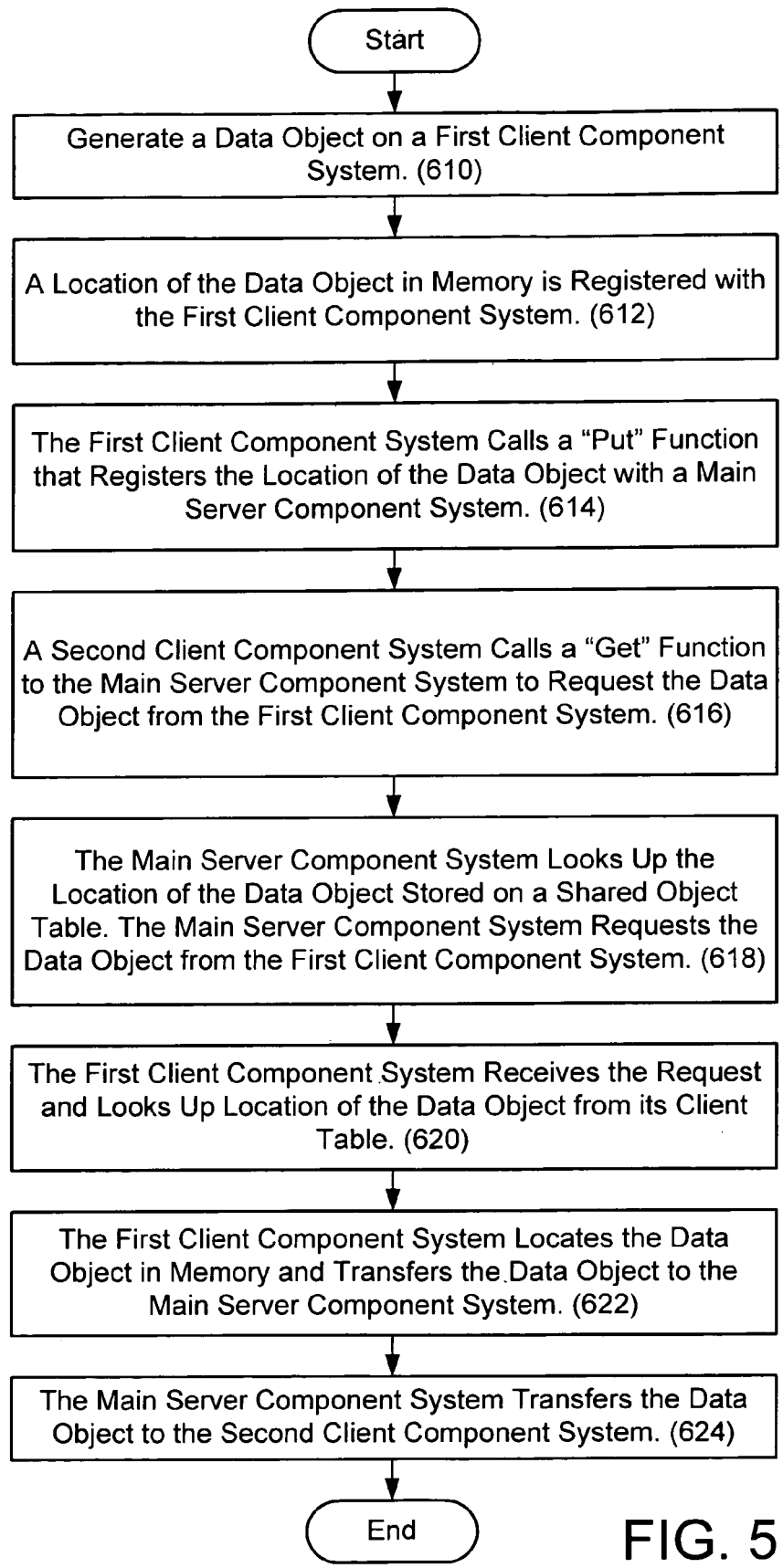
FIG. 5 is a block diagram showing exemplary functional blocks illustrating a method to transfer the data object in the first client component system to the second client component system, in accordance with an embodiment of the present invention.

FIG. 5 is a block diagram showing exemplary functional blocks illustrating an embodiment of a method to transfer a data object in a first client component system to a second client component system. Starting at operation 610, the first client component system generates the data object to be stored in its first memory. In one embodiment, a location of the data object in the first memory is registered with the first client component system in operation 612. Subsequently, if a user configures the data object to be shared with the second client component system, the first client component system registers the location of the data object with a main server component system. In order for the first client component system to register the location of the data object with the main server component system, the first client component system calls a "put" function, in accordance with an embodiment of the present invention. The "put" function has a following syntax:

put[b] obj <object name> [<registered name>] [time <int> |num <int>]

In accordance to the syntax, the "put" function registers the location of the data object with an <object name> with the main server component system. By registering, the shared object table stores the location of the data object under a <registered name>. If a user does not specify the <registered name>, the data object is stored in the shared object table with the default <object name>.

In another embodiment, the user may also assign a time life value to the data object in order to avoid memory starvation problems. The time life value specifies a length of time that the data object can exist. In accordance to the above syntax, the user can specify the time <int> that the data object can exist. The time <int> value can be any increment of time such as seconds, minutes, hours, days, weeks, etc. In another embodiment, the time life value can also specify a limit as to a number of time the data object can be requested. In accordance to the above syntax, the user can specify the number <int> of time that the data object can be requested. After the "put" function is executed, the "put" function returns either a value 1 or 0. The value of 0 indicates that registering the data object is a success. The value of 1 indicates that registering the data object is not successful.

If the first client component system registers multiple data objects with the same <registered name>, the main server component system will overwrite the <registered name> with a later submitted <registered name>. As a result, the shared object table stores the location of the last submitted data object and not the earlier submitted data objects. In order to avoid this problem, the user can call a "putb" function, in accordance with one embodiment of the present invention. If another data object with the same <registered name> exists, calling the "putb" function will block execution instruction and delay registering the location of the data object until the earlier submitted data object with the same <registered name> is deleted or when the time life value of the earlier submitted data object expires.

If the data object is a saved file, the syntax of the "put" function is "put[b] file" instead of "put[b] obj," in accordance with another embodiment of the present invention. The "put file" function is essentially identical to the "put object" function with the exception that the "put file" function registers the data object with a <file name> instead of the <object name>.

In operation 616, the second client component system calls a "get" function to request the data object from the first client component system. In an exemplary embodiment, the "get" function has a following syntax:

get[b] obj <registered name> [<object name>]

In accordance to the syntax, the second client component system requests the data object with <registered name> and the "get" function assigns an <object name> to the data object for identification by the second client component system. If the user does not specify the <object name>, the "get" function will assign the default <registered name> to the data object for identification by the second client component system. In another embodiment, the user can call a "getb" function whereby the function will block execution process if the requested data object is not registered with the main server component system.

The "get" function can also request data objects saved as files, in accordance to an embodiment of the present invention. If the data object is a saved file, the syntax of the of the "get" function is "get[b] file" instead of "get[b] obj." The "get file" function is essentially identical to the "get obj" function with the exception that the "get file" function retrieves the data object with a <file name> instead of the <object name>.

In operation 618, the main server component system looks up the location of the data object stored in the shared object table and requests the data object from the first client component system. Thereafter, in operation 620, the first client component system receives the request and looks up the location of the data object from its client table, in accordance with one embodiment of the present invention. Subsequently, in operation 622, the first client component system locates the data object in its memory and transfers the data object to the main server component system. After receiving the data object, the main server component system transfers the data object to the second client component system in operation 624. Thereafter, the "get" function returns either a value 1 or 0 after the transfer. The value of 0 indicates that retrieving the data object from the first client component system is a success. The value of 1 indicates that retrieving the data object is not successful.

If the user doesn't think that the data object is further needed for sharing with the second client component system, the user can call a "remove" function. In an exemplary embodiment, the "remove" function has a following syntax:

remove <registered name>

In accordance to the syntax, the "remove" function removes the record of the data object, either as an object or a file, with the <registered name> from the shared object table and the client table. In another embodiment, the "remove" function also deletes the data object from the memory of the client component system. If the data object is being transferred when the user calls the "remove" function, the function will wait until the transfer is complete.

Figure 6:
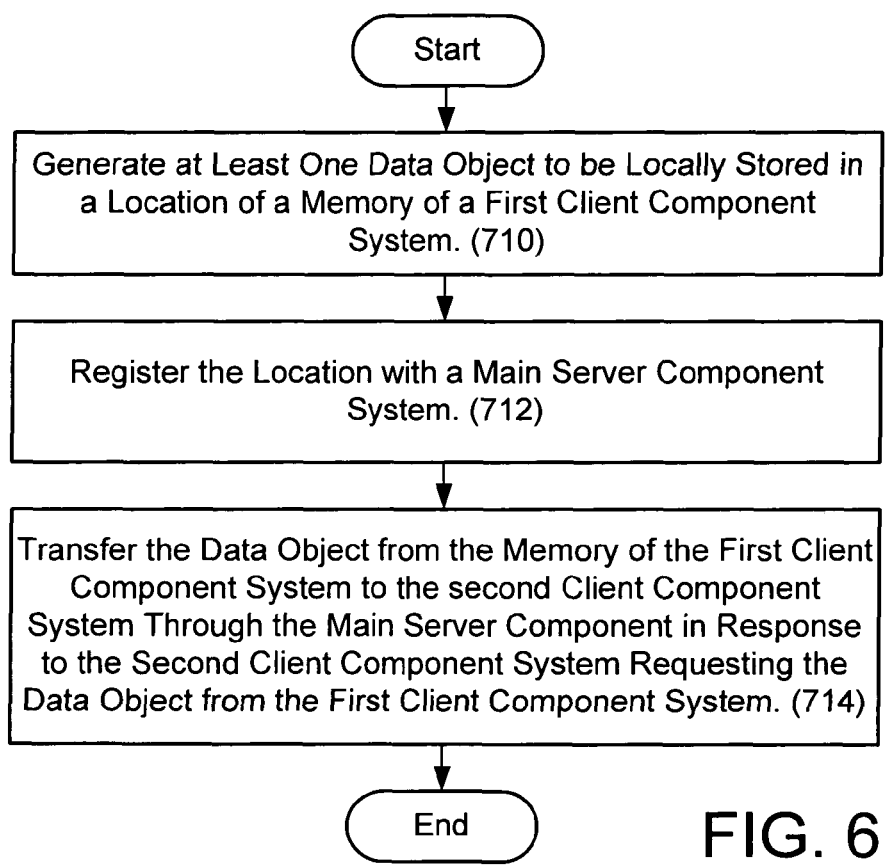
FIG. 6 is a block diagram showing exemplary functional blocks illustrating a method for testing a software product in a distributed testing system, in accordance with another embodiment of the present invention.

FIG. 6 is a block diagram showing exemplary functional blocks illustrating another embodiment of a method for testing a software product in a distributed testing system where the distributed testing system includes a main server component system and at least two client component systems. Starting in operation 710, the method generates at least one data object to be locally stored in a memory of the first client component system. In operation 712, the first client component system registers a location of the data object with the main server component system. Thereafter, in operation 714, the method transfers the data object from the first client component system to the second client component system in response to the second client component system requesting the data object from the first client component, system through the main server component system.

With the above embodiments in mind, it should be understood that, the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for testing a software product in a distributed testing system, the distributed testing system including a main server component system and at least two client component systems, comprising:

generating at least one data object as a result of testing the software product, the data object to be locally stored in a first location of a first memory of the first client component system;

registering the first location with the main server component system;

requesting the data object from the first memory of the first client component system for the second client component system through the main server component, the second client component requesting the data object if the data object is needed to continue further testing of the software product using the second client component system;

transferring the data object from the first memory of the first client component system to a second memory of the second client component system; and using the data object to continue testing of the software product on the second client component system;

wherein the data object is defined by one of a resulting test data generated after executing a portion of a test at the first client component system, an identification key, a dynamically generated Java class, a configuration file, a property file, and an initial test data transmitted by the main server component system to each of the first and second client component systems to initialize the test.

2. A computer-implemented method for testing a software product in a distributed testing system as recited in claim 1, wherein the registering the first location further comprising, storing the first location in a shared object table of the main server component system.

3. A computer-implemented method for testing a software product in a distributed testing system as recited in claim 1, further comprising, registering the first location with the first client component system.

4. A computer-implemented method for testing a software product in a distributed testing system as recited in claim 3, wherein the registering the first location further comprising, storing the first location in a client table of the first client component system.

5. A computer-implemented method for testing a software product in a distributed testing system as recited in claim 1, wherein the registering the first location with the main server component system is defined by one of a put function and a putb function.

6. A computer-implemented method for testing a software product in a distributed testing system as recited in claim 1, wherein the identification key is used in a secured protocol to establish a secured communication between the main server component system and each of the first and second client component systems.

7. A computer-implemented method for testing a software product in a distributed testing system as recited in claim 1, wherein the each of the first and second memory is defined by one of a random-access memory (RAM), a dynamic RAM (DRAM), and a static RAM (SRAM).

8. A computer-implemented method for testing a software product in a distributed testing system as recited in claim 1, wherein the first location is a memory address of the first memory.

9. A computer-implemented method for testing a software product in a distributed testing system as recited in claim 1, wherein the second client component system requesting the data object from the first client component system is defined by one of a get function and a getb function.

10. A computer-implemented method for testing a software product in a distributed testing system as recited in claim 1, further comprising,
   executing a distributed test harness on the main server component system; and
   executing a client harness on each of the first and second client component systems.

11. A computer-implemented method for testing a software product in a distributed testing system, the distributed testing system including a main server component system and at least two client component systems, comprising:
   executing a portion of a software product test at a first client component system, the executing generating at least one data object associated with the software product test to be locally stored in a first location of a first memory of the first client component system;
   registering the first location with the main server component system;
   transferring the data object from the first memory of the first client component system to a second memory of the second client component system; the transferring being in response to the second client component system requesting the data object from the first client component system through the main server component system; and
   executing another portion of the software product test at the second client component system using the data object from the first client component system;
   wherein the data object is defined by one of a resulting test data generated after executing a portion of a test at the first client component system, an identification key, a dynamically generated Java class, a configuration file, a property file, and an initial test data transmitted by the main server component system to each of the first and second client component systems to initialize the test.

12. A computer-implemented method for testing a software product in a distributed testing system as recited in claim 11, wherein the registering the first location further comprising, storing the first location in a shared object table of the main server component system.

13. A computer-implemented method for testing a software product in a distributed testing system as recited in claim 11, further comprising,
   registering the first location with the first client component system.

14. A computer-implemented method for testing a software product in a distributed testing system as recited in claim 13, wherein the registering the first location further comprising, storing the first location in a client table of the first client component system.

15. A computer-implemented method for testing a software product in a distributed testing system as recited in claim 11, wherein the registering the first location with the main server component system is defined by one of a put function and a putb function.

16. A computer-implemented method for testing a software product in a distributed testing system as recited in claim 11, wherein the each of the first and second memory is defined by one of a random-access memory (RAM), a dynamic RAM (DRAM), and a static RAM (SRAM).

17. A computer-implemented method for testing a software product in a distributed testing system as recited in claim 11, wherein the first location is a memory address of the first memory.

18. A computer-implemented method for testing a software product in a distributed testing system as recited in claim 11, wherein the second client component system requesting the data object from the first client component system is defined by one of a get function and a getb function.

19. A computer-implemented method for testing a software product in a distributed testing system as recited in claim 11, further comprising,
   executing a distributed test harness on the main server component system; and
   executing a client harness on each of the first and second client component systems.

20. A system for testing a software product in a distributed testing system, comprising:
   a main server component system that manages testing of the software product on client component systems;
   a first client component system, the first client component system being in communication with the main server component system to test the software product;
   a data object located in a memory of the first client component system, the data object a result of the software product test conducted by the first client component system;
   a second client component system, the second client component system being in communication with the main server component system to test the software product;
   wherein the main server component system facilitates communication between each of the first and second client component systems, and wherein a location of the data object is registered with the main server component system for use in transferring the data object from the first client component system to the second client component system if the second client component needs the data object to further test the software product;

wherein the data object is defined by one of a resulting test data generated after executing a portion of a test at the first client component system, an identification key, a dynamically generated Java class, a configuration file, a property file, and an initial test data transmitted by the main server component system to each of the first and second client component systems to initialize the test.

21. A system for testing a software product in a distributed testing system as recited in claim 20, further comprising, a distributed test harness executed on the main server component system;

a first client harness executed on the first client component system; and a second client harness executed on the second client component system.

22. A system for testing a software product in a distributed testing system as recited in claim 20, wherein the main server component system includes a shared object table for storing the location of the data object.

23. A system for testing a software product in a distributed testing system as recited in claim 20, wherein the first client component system includes a client table for storing the location of the data object.

24. A system for testing a software product in a distributed testing system as recited in claim 20, further comprising a data transfer monitor facility coupled to the main server component system.

25. A system for testing a software product in a distributed testing system as recited in claim 20, wherein the identification key is used in a secured protocol to establish a secured communication between the main server component system and each of the first and second client component systems.

26. A system for testing a software product in a distributed testing system as recited in claim 20, wherein the memory is defined by one of a random-access memory (RAM), a dynamic RAM (DRAM), and a static RAM (SRAM).

27. A system for testing a software product in a distributed testing system as recited in claim 20, wherein the location is a memory address of the memory.

* * * * *